United States Patent Office 3,404,117
Patented Oct. 1, 1968

3,404,117
ADHESIVE FILM-FORMING COMPOSITIONS WHICH IN THE DRY STATE ARE INSOLUBLE IN WATER AND DRY CLEANING SOLVENTS
Melville W. Uffner, Easton, Pa., assignor to GAF Corporation, a corporation of Delaware
No Drawing. Filed July 6, 1966, Ser. No. 563,052
7 Claims. (Cl. 260—30.2)

ABSTRACT OF THE DISCLOSURE

Adhesive film-forming compositions which are non-flammable and substantially insoluble in water and dry cleaning solvents are being copolymer containing 1 part by weight of N-vinyl lactam of the formula

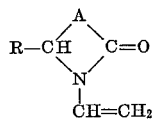

wherein R is hydrogen or alkyl and A represents an alkylene of $-CH_2-CH_2-$, or $-CH_2-CH_2-CH_2-$ or $-CH_2-CH_2-CH_2-CH_2-$, and from 2 to 2.5 parts by weight of a fluorinated monomer of the formula:

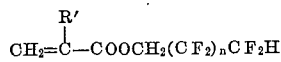

wherein R' is hydrogen or methyl and $n$ is a positive integer of from 1 to 7, a plasticizing agent is a N-ethyl-o-toluenesulfonamide, or N-ethyl-p-toluenesulfonamide, or methyl phthalyl ethyl glycolate, or ethyl phthalyl ethyl glycolate, or butyl phthalyl butyl glycolate, or liquid acrylonitrile polymer or sulfonamide-formaldehyde resin, polyamide or cyclohexanone-formaldehyde condensation product, dissolved in at least one solvent of toluene, or xylene, ethyl benzene, or aliphatic alcohols, or gamma-butyrolactone, or N-methyl-2-pyrrolidone, dialkyl formamides, or aliphatic ketones.

---

This invention relates to a new and useful class of adhesive film-forming compositions of a soft and flexible character, which are non-flammable and substantially insoluble in water and conventional dry cleaning solvents.

Film-forming compositions prepared by the copolymerization of N-vinyllactams with monoethylenically unsaturated polymerizable monomers are well-known in the art and find application in a wide area of use. By reason of the inherent characteristics of N-vinyllactams, a majority of such copolymers are in general water soluble, as well as soluble in a variety of organic solvents, and are therefore particularly adaptable where such solubility is a prerequisite, such as, for example, in pharmaceutical, cosmetic, textile, and lithographic uses. The inherent water solubility of such copolymers has, however, virtually precluded their use in industrial application where water insolubility is a prime and essential prerequisite.

It is the principal object of the present invention to provide adhesive film-forming compositions which are not only substantially insoluble in water but also substantially insoluble in various conventional dry cleaning solvents.

Other objects and advantages will become more clearly manifest from the following description.

I have found that the foregoing objects are readily attained by blending dry on a rubber or Banbury mixer or any suitable heavy duty kneader 100 parts by weight of a copolymer obtained by copolymerizing one part by weight of an N-vinyllactam with from 2 to 2½ parts by weight of ether a fluoroalkyl acrylate or fluoroalkyl methacrylate with 20 to 30 parts by weight of a plasticizing agent which is substantially insoluble in water and dry cleaning solvents, and the blend diluted with any suitable solvent or solvent mixture to yield a homogenous and flowable composition at about room temperature. It is preferred, however, to blend the copolymer and plasticizing agent directly in the solvent or solvent mixture. The adhesive film-forming compositions thus prepared are quite unique in that they provide adhesives which bond tenaciously to a wide variety of substrates and such bonds withstand dry cleaning and water washing without the need for cross-linking the compositions. It is well recognized that heretofore such dry cleanable and water wash resistant bonds required the curing or cross-linking of the bonding system.

In preparing the adhesive film-forming compositions of the present invention, it is first necessary to prepare the copolymer of the N-vinyllactam with either fluoroalkyl acrylate or fluoroalkyl methacrylate. The N-vinyllactams employed as the primary reactants in forming the copolymers of this invention are characterized by the following formula:

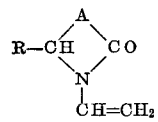

where R is an alkyl group of 1 to 4 carbon atoms, or usually a hydrogen atom, and A represents an alkylene group supplying two to four carbon atoms between the

group and the $=C=O$ group and having a total of two to about ten carbon atoms, the alkylene group being straight chained or branched. Typical N-vinyllactams include N-vinylpyrrolidinone itself, N-vinylpiperidone, N-vinylcaprolactam, N - vinyl - 3 - methylpyrrolidinone or -piperidone, or -caprolactam, N-vinyl-4-methylpyrrolidinone, or -piperdone or -caprolactam, N-vinyl-5-methylpyrrolidinone or -piperidone, N-vinyl-3-ethylpyrrolidinone, N - vinyl - 3-butylpyrrolidinone, N-vinyl-3,3-dimethylpyrrolidinone, N - vinyl - 4,5-dimethylpyrrolidinone, N-vinyl-5,5 - dimethylpyrrolidinone, N - vinyl - 3,3,5-trimethylpyrrolidinone, N - vinyl - 5, - methyl-5-ethylpyrrolidinone, N-vinyl - 3,4,5 - trimethyl-3-ethylpyrrolidinone, N-vinyl-6-methyl - 2 - piperidone, N - vinyl - 6-ethyl-2-piperidone, N-vinyl - 3,5-dimethyl-2-piperidone, N-vinyl-4,4-dimethyl-2-piperidone, N-vinyl-6-butylpiperidone, N-vinyl-7-methylcaprolactam, N - vinyl - 7-ethylcaprolactam, N-vinyl-4-isopropylcaprolactam, N - vinyl-4-butylcaprolactam, N-vinyl-5-tertbutylcaprolactam, N-vinyl-3,5-dimethylcaprolactam, N-vinyl-4,6-dimethylcaprolactam, N-vinyl-3,5,7-trimethylcaprolactam, or N-vinyl-2-methyl-4-isopropylcaprolactam. Comparable compounds available from the corresponding thiolactams may also be used in preparing the copolymer.

The fluoroalkyl acrylates and fluoroalkyl methacrylates which are copolymerized with the foregoing N-vincyllactams are characterized by the following formula:

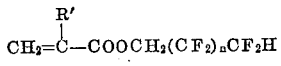

wherein R' is either hydrogen or methyl and $n$ has a value of from 1 to 7. They are readily prepared by conventional esterification of acrylic or methacrylic acid with primary alpha, alpha-omega trihydrofluoroalcohols of the formula $HOCH_2(CF_2)_nCF_2H$, wherein $n$ has the same value as above. They are also commercially available under carbon numbers such as $C_3$ to $C_9$ which indicate that the total number of carbon atoms in the fluoro alcohol moiety of the monomeric fluoroalkyl acrylate and fluoroalkyl methacrylate range from 3 to 9.

The copolymers of the foregoing N-vinyllactams and fluoroalkyl acrylate or fluoroalkyl methacrylate are readily prepared by conventional copolymerization procedures wherein the ratio of the two monomers is one part by weight of N-vinyllactam and from 2 to 2½ parts by weight of the fluoroalkyl acrylate or fluoroalkyl methacrylate. The copolymerization is preferably carried out in a low-boiling solvent such as methanol, in the presence of any one of the conventional catalysts such as ammonium persulfate, tertiary butyl peroxide, alpha, alpha-azodiisobutyronitrile, and the like. The amount of catalyst employed may range from 0.05 to 5% by weight based on the total weight of the comonomer mixture. The temperature of copolymerization may vary from about 50° to about 100° C. It is preferred, however, to conduct the copolymerization reaction at about 60–70° C. in order to avoid a violent reaction. The copolymerization is preferably carried out in a reaction vessel under a blanket of inert gas such as nitrogen. When ammonium persulfate is employed as catalyst, it is best to dissolve it in a sufficient quantity of distilled water, the resulting solution placed in the reaction vessel, followed by the addition of alcohol, purging with nitrogen, and the mixture of the comonomers.

The following examples will ilustrate the manner in which the various copolymers utilized in accordance with the present invention are prepared, wherein all parts are by weight unless otherwise noted.

EXAMPLE 1

0.7 part of ammonium persulfate was dissolved in 60 parts of water. The solution was charged in a 500 ml. flask equipped with mechanical stirrer, reflux condenser, dropping funnel, gas inlet tube and thermometer. 140 parts of methanol were added and the system was purged thoroughly with nitrogen. A mixture of 22 parts of N-vinylpyrrolidone and 57.2 parts of $C_5$-fluoro acrylate ($n=3$ in formula given above) was added in one batch. The temperature was raised to 60° C. and the mixture was allowed to react att his temperature for three hours. The polymer separated during the polymerization in the form of a white rubbery solid.

EXAMPLE 2

One part ammonium persulfate was dissolved in 60 parts of distilled water. The solution was placed in a one-liter resin kettle equipped with reflux condenser, mechanical stirrer, gas inlet tube, dropping funnel and thermometer. 140 parts of methanol were added and the system was purged thoroughly with nitrogen. A mixture of 25 parts of N-vinylpyrrolidone and 50 parts of $C_9$-fluoroacrylate ($n=7$ in the formula given above) were introduced in one batch. The temperature of the mixture was raised to 60° C. and the reaction was allowed to proceed at this temperature for three hours. The polymer formed separated from the solution in the form of a white rubbery mass.

While following the procedure of Example 1, the following copolymerization reactions were conducted while employing the specified parts by weight of various N-vinyllactams, fluoroalkyl acrylates and fluoroalkyl methacrylates.

| Example | N-vinyllactam | Parts by weight | Fluoroalkyl acrylate | Parts by weight | Appearance of copolymer |
|---|---|---|---|---|---|
| 3 | N-vinylpiperidone | 25 | $C_9$ | 50 | White rubbery solid. |
| 4 | N-vinylcaprolactam | 25 | $C_1$ | 50 | Do. |
| 5 | 5-methyl-N-vinylpyrrolidone | 25 | $C_5$ | 50 | Do. |
| 6 | 5-ethyl-N-vinylpyrrolidone | 25 | $C_3$ | 67.5 | Do. |
| | | | Fluoroalkyl Methacrylate | | |
| 7 | N-vinylpyrrolidone | 25 | $C_3$ | 67.5 | Do. |
| 8 | N-vinylpiperidone | 25 | $C_9$ | 50 | Do. |
| 9 | 5-ethyl-N-vinylpyrrolidone | 25 | $C_5$ | 50 | Do. |

The various copolymers prepared according to Examples 1 to 9, inclusive, were washed with water and dried at room temperature. All of the copolymers are insoluble in water and in aliphatic hydrocarbons, but are readily soluble in alcohols, esters, ethers, ketones, aldehydes, and aromatic hydrocarbons.

In preparing the adhesive film forming compositions of the present invention while employing the copolymers prepared as above, 100 parts by weight of the dried copolymer are blended with 20–30 parts by weight of any conventional plasticizer which is substantially insoluble in water (or which will not be water-leached from the composition) and in the conventional dry cleaning solvents such as Stoddard 140° F. solvent, trichloroethylene, perchloroethylene, carbon tetrachloride, methylene chloride, and the like, and the blend diluted with any compatible organic solvent or a mixture of solvents by any convenient method of stirring, agitating or rotating the mixture in a closed vessel until a homogenous and flowable composition is obtained. The means of solvating polymers and copolymers blended with other compatible materials is a well-known art and no difficulty will be encountered in attaining a homogenous and flowable composition.

As suitable plasticizers conforming to the foregoing requirements, the following are illustrative: N-alkyl-o- or p-toluene-sulfonamides or mixtures thereof, such as, for example, N-ethyl-o- or p-toluene-sulfonamide; short-chained glycolates such as, for example, methyl phthalyl ethyl glycolate, ethyl phthalyl ethyl glycolate, butyl phthalyl butyl glycolate, liquid acrylonitrile copolymer having a specific Mooney gravity viscosity of 0.98 (such as Hycar 1312 of B. F. Goodrich), etc.

As substitutes for the above plasticizers, resinous materials such as sulfonamide-formaldehyde resins, polyamides, ketone resins (e.g., cyclohexanone-formaldehyde condensation product), and the like may be employed. Such substitutes will render the copolymer soft and pliant (flexible) and will not be leached out by water or dry cleaning solvents from the final composition.

A blend of an equal mixture of the foregoing plasticizers and substitute resinous materials in the aforestated proportions may also be employed to yield satisfactory adhesive film forming compositions.

As solvents in which the copolymer and plasticizer are soluble, I prefer aromatic hydrocarbons such as toluene; o-, m- and p-xylene; ethylbenzene, and the like, alcohols of from 2 to 4 carbon atoms, e.g., ethanol, propanol, isopropanol-n-butanol, etc., heterocyclic solvents such as γ-butyrolactone, N-methyl-2-pyrrolidone; dialkyl formamides such as dimethyl-, diethyl-, dipropyl-formamides, etc., aliphatic ketones such as methyl ethyl ketone, diethyl ketone, methyl propyl ketone, isopropyl methyl ketone, tert-butyl methyl ketone, and the like. As a guide, from about 400 to about 600 parts of any one or a mixture of these solvents may be employed per 120 to 130 parts by weight of the blend of copolymer and plasticizing agent to yield a homogenous and flowable composition.

Five-gram portions of each of the copolymers obtained from Examples 1 to 3, inclusive, were separately mixed, by stirring, in beakers with 1 gram of a mixture of N-ethyl-o- and p-toluenesulfonamide (commercially available under the brand name of Santicizer 8 from Monsanto Chemical Co.) and 24 grams of methyl ethyl ketone. Five-gram portions of each of the copolymers obtained from Examples 4 to 6, inclusive, were blended in a similar manner wtih the exception that the plasticizer, "Santicizer 8" was replaced by 1 gram of a sulfonamide/formaldehyde condensation resin (commercially available under the brand name of "Santolite MHP" from Monsanto Chemical Company), and the copolymers of Examples 7 to 9, inclusive, were also blended in a similar manner with the exception that the condensation resin "Santolite MHP" was replaced by 1 gram of formaldehyde/cyclohexanone condensation resin (commercially available under the brand name of Krumbhaar Resin K–1717 (obtained from Lawter Chemicals, Inc.).

The nine separate solutions of the copolymeric blends were subjected to a qualitative adhesion test. In this test, several drops of each solution were placed on separate glass microscope slides, substrates of cellulose acetate, aluminum foil, polyamide film, polyester film and films of polymers of α-ethylenically unsaturated polyfluorohydrocarbons such as "Aclar," sold by Allied Chemical; polytri- and polytetra-fluoroethylenes (the latter being Dupont's Teflon), and polychlorotrifluoroethylene (Kel-F); and FEP, a copolymer of tetrafluoroethylene and hexafluoropropylene.

The glass slides and the various substrates were then dried at room temperature. On top of each of the coated glass slides one of each of the foregoing uncoated film substrates was placed, and on top of each coated film substrate its uncoated image and all laminates subjected to a pressure of 10 p.s.i. gauge at 275° F. for a 2-second dwell period. The resulting bonds were then aged for 24 hours at 50% relative humidity and a temperature of 23° C., before being subjected to both slow and shock tear. The ratings obtained ranged from excellent to good.

Bonds of unsupported plasticized polyvinylchloride film to cotton were made as above with each of the solutions of Examples 1 to 9 inclusive. All of the resulting bonds withstood 24 hours' immersion in perchloroethylene dry cleaning solvent and in water containing 1% detergent. No delamination occurred. Upon evaporation of the water or the solvent from the laminates, the bonds were found to be strong as they had been prior to immersion. This is indeed surprising and unexpected, since previously it was not possible to accomplish this bonding with currently available water or solvent based adhesives, even of the cross-linking type. To make such bonds, it was necessary to employ either a latex, or plastisol, or organosol composition based upon polyvinylchloride and these compositions required a fusing process to effect the bond. The time and temperature required to effect such fusion was sorely dependent upon polyvinylchloride's poor heat stability. As a compromise, fusion was done at about 250–350° F. for a period of time ranging from 3 to 5 minutes. The time factor necessarily limited production output. With the adhesive film forming compositions of the present invention, bonds can be made in a matter of seconds by passing the laminate through a hot nip-roll or over a heated drum, which is the customary practice for laminating polyvinylchlorides to other substrates, such as, textile fabrics, foils of various types and the like, the resulting laminates being serviceable after dry cleaning and/or washing.

The adhesive film forming compositions of the present invention have excellent water, hydrocarbon oil, and dry cleaning solvent repellency, and non-flammability; and their films are soft and flexible. In view of these characteristics they are suitable for making non-flammable, water washable and dry cleanable bonds between a wide variety of chemically dissimilar substrates. Industrial applications would include: fabric laminations, vinyl laminations, film to cellulosics and film to fabric laminations, flocking, non-wovens, urethane foam to fabric or to vinyl laminations, non-flammable glitter binders, adhesion of cut-out fabric designs to fabric (by heat seal technique) without loss of softhand.

They are also suitable for marketing as repair kit type adhesives for mending clothing at home, or as a military repair kit, to mend fabrics and unsupported as well as supported polyvinylchloride film by the application of an adhesive coated patch rather than by stitching. Such bonds can be made wet (i.e., from adhesive composition in solvent medium) and without the application of heat; but rapid bonding can be accomplished by holding a hot iron in contact with the laminate (only one adherent face being coated) for a few seconds. Obviously such bonds provide water-resistant welds, while mechanical stitching does not. The bonds will also withstand dry cleaning and washing in water containing a detergent.

They also provide means of making washable and dry cleanable laminates of polyurethane foam to fabric and to polyvinylchloride. At the present time polyurethane to fabric laminates are made by one of the following processes: thermal (flame) lamination, polyurethane adhesives, compounded emulsions (natural or synthetic rubber, polyacrylic esters), and thermoplastic powders. Each of these methods has disadvantages. Thermal lamination results in the melting and loss of an appreciable amount of foam. Polyurethane adhesives are toxic, since they usually are used as 2-component or 1-component systems containing some or an appreciable amount of free isocyanate. Rubber based adhesives do not offer both washability and dry cleaning resistance unless they are cured at an elevated temperature for 15 to 30 minutes. The polyacrylic esters also require a cure period of from 1 to 3 minutes. Obviously, too, some fabrics will not tolerate high cure temperatures. The high temperatures needed for the melting of thermoplastic powder adhesives also limit their applicability to use with fabrics which will tolerate the required heats.

I claim:
1. Adhesive film-forming composition, which in the dried form is substantially insoluble in water and dry cleaning solvents, comprising a blend of 100 parts by weight of a coplymer containing 1 part by weight of N-vinyl lactam of the formula

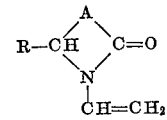

wherein R is selected from the class consisting of hydrogen and alkyl of from 1 to 4 carbon atoms and A represents an alkylene group selected from the class consisting of —CH$_2$—CH$_2$—, —CH$_2$—CH$_2$—CH$_2$— and

—CH$_2$—CH$_2$—CH$_2$—CH$_2$— and from 2 to 2.5 parts by weight of a fluorinated monomer of the formula:

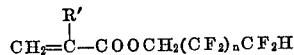

wherein R' is selected from the class consisting of hydrogen and methyl and n is a positive integer of from 1 to 7, and from 20 to 30 parts by weight of plasticizing agent which is substantially insoluble in water and dry cleaning solvents and is selected from the class consisting of N-ethyl-o-toluenesulfonamide, N-ethyl - p - toluenesulfonamide, methyl phthalyl ethyl glycolate, ethyl phthalyl ethyl glycolate, butyl phthalyl butyl glycolate, liquid acrylonitrile polymer having a specific Mooney gravity viscosity of 0.98, sulfonamide-formaldehyde resin, polyamide and cyclohexanone-formaldehyde condensation product, dissolved in at least one solvent selected from the class consisting of toluene, xylene, ethyl benzene, aliphatic alcohols of from 2 to 4 carbon atoms, gamma-butyrolactone, N-methyl-2-pyrrolidone, dialkyl formamides, and aliphatic ketones of from 4 to 6 carbon atoms in an amount ranging from 400 to 600 parts per 120 to 130 parts by weight of said blend of copelymer and said plasticizer to yield a homogeneous and flowable composition.

2. Adhesive film-forming composition according to claim 1, wherein the N-vinyllactam is N-vinylpyrrolidone.

3. Adhesive film-forming composition according to claim 1 wherein the N-vinyllactam is N-vinylpiperidone.

4. Adhesive film-forming composition according to claim 1, wherein the N-vinyllactam is N-vinylcaprolactam.

5. Adhesive film-forming composition according to claim 1, wherein the N-vinyllactam is 5-methyl-N-vinylpyrrolidone.

6. Adhesive film-forming composition according to claim 1, wherein the N-vinyllactam is 5-ethyl-N-vinylpyrrolidone.

7. Adhesive film-forming composition, which in the dried form is substantially insoluble in water and dry cleaning solvents, comprising 16.66% by weight of a copolymer containing 1 part by weight of N-vinyl-pyrrolidone and 2 parts of a fluorinated monomer of the formula

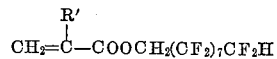

wherein R' is selected from the class consisting of hydrogen and methyl, and 3.33% by weight of an equal mixture of N-ethyl-o-toluenesulfonamide and N-ethyl-p-toluenesulfonamide dissolved in 80% by weight of methyl ethyl ketone.

References Cited
UNITED STATES PATENTS

| | | | |
|---|---|---|---|
| 3,174,951 | 3/1965 | Taber | 260—30.8 |
| 3,145,147 | 8/1964 | Glickman | 260—86.1 |
| 2,841,573 | 7/1958 | Ahbrecht | 260—33.8 |

JULIUS FROME, *Primary Examiner.*